United States Patent [19]
Kim

[11] Patent Number: 6,069,619
[45] Date of Patent: May 30, 2000

[54] APPARATUS AND METHOD FOR DISPLAYING DPMS MODE STATUS USING AN OSD CIRCUIT

[75] Inventor: Young-Chan Kim, Kyungki-do, Rep. of Korea

[73] Assignee: SamSung Electronics Co., Ltd., Kyungki-do, Rep. of Korea

[21] Appl. No.: 09/028,355

[22] Filed: Feb. 24, 1998

[30] Foreign Application Priority Data

Feb. 24, 1997 [KR] Rep. of Korea ........................ 97-05492

[51] Int. Cl.[7] ........................................................ G09G 5/00
[52] U.S. Cl. ........................................... 345/211; 345/213
[58] Field of Search ..................................... 345/211, 212, 345/213, 147, 204, 10, 11, 12, 13, 20, 27; 348/564, 588, 589

[56] References Cited

U.S. PATENT DOCUMENTS

| | | |
|---|---|---|
| 5,389,952 | 2/1995 | Kikinis . |
| 5,396,635 | 3/1995 | Fung . |
| 5,428,790 | 6/1995 | Harper et al. . |
| 5,430,493 | 7/1995 | Kim ........................................ 348/564 |
| 5,555,032 | 9/1996 | Kung . |
| 5,586,333 | 12/1996 | Choi et al. . |
| 5,670,972 | 9/1997 | Kim ........................................... 345/13 |
| 5,949,400 | 9/1999 | Kim .......................................... 345/147 |

*Primary Examiner*—Xiao Wu
*Attorney, Agent, or Firm*—Robert E. Bushnell, Esq.

[57] ABSTRACT

An apparatus and method for displaying the status of a current display power management signaling (DPMS) mode in a display device uses an on-screen display (OSD) circuit. The current DPMS mode is determined based on an input status of video sync signals and the connection of a signal cable. The current DPMS mode status data is stored in an internal memory of a microcomputer. The OSD circuit is driven using an OSD drive signal output from the microcomputer, so that a message indicative of the stored status data can be momentarily displayed on the display device. In a DPMS mode, any front panel key acts as a program interrupt for DPMS mode operation, which, upon activation, initiates a sequence whereby the DPMS mode is set to normal, horizontal and vertical sync signals are generated, the stored DPMS mode status data is read, and an OSD drive signal is generated. After a time sufficient for user recognition of the current DPMS mode, the OSD drive signal is discontinued and the DPMS mode is reset.

19 Claims, 5 Drawing Sheets

APPARATUS AND METHOD FOR DISPLAYING DPMS MODE STATUS USING AN OSD CIRCUIT

CLAIM OF PRIORITY

This application makes reference to, incorporates the same herein, and claims all benefits accruing under 35 U.S.C. § 119 from my application entitled Display Power Management Signaling Display Method Using On-Screen Display in Display Device filed with the Korean Industrial Property Office on Feb. 24, 1997, and there duly assigned Ser. No. 97-5492 by that Office.

BACKGROUND OF THE INVENTION

1. Field of the Invention

The present invention relates to display devices and, more particularly, to a method for displaying the current status of a display device adopting a display power management signaling (DPMS) standard, and an apparatus for achieving the same, which enables DPMS mode verification using an on-screen display (OSD) circuit.

2. Discussion of Related Art

A display device for use with a personal computer is generally manufactured with internal control means for reducing power consumption, such as the DPMS standard. In conformity with the DPMS standard, the host computer, which typically includes a video card, selectively supplies (or blocks) horizontal and vertical sync signals to the display device according to the computer's state of use, which is continually monitored in order to conserve power. Thus, a DPMS function enables the display device to manage its power distribution according to the presence (or absence) of the video sync signals. The power management states are classified into an "on" (normal) state, a standby state, a suspend state and a power-off state.

| DPMS state | sync signal applied | |
|---|---|---|
| | horizontal | vertical |
| on | yes | yes |
| standby | no | yes |
| suspend | yes | no |
| off | no | no |

As shown in the above table, both the horizontal and vertical sync signals are applied to the display device in the "on" state, only the vertical sync signal is applied in the standby state, only the horizontal sync signal is applied in the suspend state, and neither sync signal is applied in the power-off state. Starting in the "on" (normal) mode, the DPMS state converts, in sequence, first to the standby mode, then to the suspend mode, and finally to the power-off mode, according to a time lapse corresponding to the lack of use of the computer system. Power management in a computer is described in, for example: U.S. Pat. No. 5,586,333 to Chun-Geun Choi et al., entitled, Method And Control Apparatus For General Power Management Signal Of Computer Peripheral Equipment In A Computer System; U.S. Pat. No. 5,555,032 to Yung-Ken Kung entitled Integrated Circuit For Economizing Power Consumption Of A Monitor By Using Two Reference Values For Discriminating The Input Signal; U.S. Pat. No. 5,428,790 to Leroy D. Harper, et al., entitled, Computer Power Management System; U.S. Pat. No. 5,396,635 to Henry T. Fung, entitled, Power Conservation Apparatus Having Multiple Power Reduction Levels Dependent Upon The Activity Of the Computer System; and U.S. Pat. No. 5,389,952 to Dan Kikinis entitled Low-Power-Consumption Monitor Standby System.

In order to notify the user of the status of a display device adopting the above DPMS function, indicator lights (e.g., LEDs) may be installed on a display device, so as to have various colors and/or blinking patterns. This, however, would consume front panel space while increasing assembly costs and would necessitate that a user be well acquainted with specified states of the indicator or indicators through a guide (manual) provided by a display device manufacturer.

Meanwhile, if the signal cable (D-sub connector) for carrying video signals output by the main body of a personal computer to the display device becomes disconnected for any reason, the DPMS state should be set to the power-off mode to minimize power consumption However, in order to display a message for warning or informing a user of such a condition by driving an OSD circuit, the power necessary for normal operation must be applied to a display device, which defeats the purpose of the DPMS function.

SUMMARY OF THE INVENTION

It is therefore an object of the present invention to provide a method for informing a user of the status of a current DPMS mode of a display device, whereby the DPMS mode is overridden for a predetermined time upon an attempt to operate any front panel key and a message indicating the DPMS state is displayed through an OSD circuit.

It is another object of the present invention to improve power-savings by providing a method which uses an OSD function for informing a user of a signal cable detachment condition.

It is yet another object of the present invention to provide an apparatus for effecting the above method.

To achieve these and other advantages and in accordance with the purpose of the present invention, as embodied and broadly described, there is provided a method of displaying the status of a current DPMS mode using an OSD circuit in a display device comprised of a microcomputer having an internal memory. The method comprises the steps of determining the current DPMS mode based on an input status of video sync signals; storing, in the internal memory of the microcomputer, status data corresponding to the determined current DPMS mode; and driving the OSD circuit for a predetermined time using an OSD drive signal output from the microcomputer, to display on the display device a message indicative of the stored status data.

According to another aspect of the present invention, there is also provided an apparatus for displaying the status of a DPMS mode on a display device controlled by a personal computer system including a video card. The apparatus comprises: an input port for receiving a horizontal sync signal and a vertical sync signal via a signal cable connecting the video card to the input port; a microcomputer, being connected to the input port and comprising an internal memory, for generating horizontal and vertical synchronous signals in response to the horizontal and vertical sync signals received by the input port; at least one user key, mounted on the display device, for inputting a key signal to the microcomputer; and an on-screen display (OSD) circuit for generating an OSD video signal comprising a message indicative of the current DPMS mode, upon DPMS mode activation of the user key.

In the present invention, DPMS operation is enhanced in the power savings is achieved even with the D-sub signal cable disconnected, since the user is informed of the detached state by way of an OSD function.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

Figure 1:
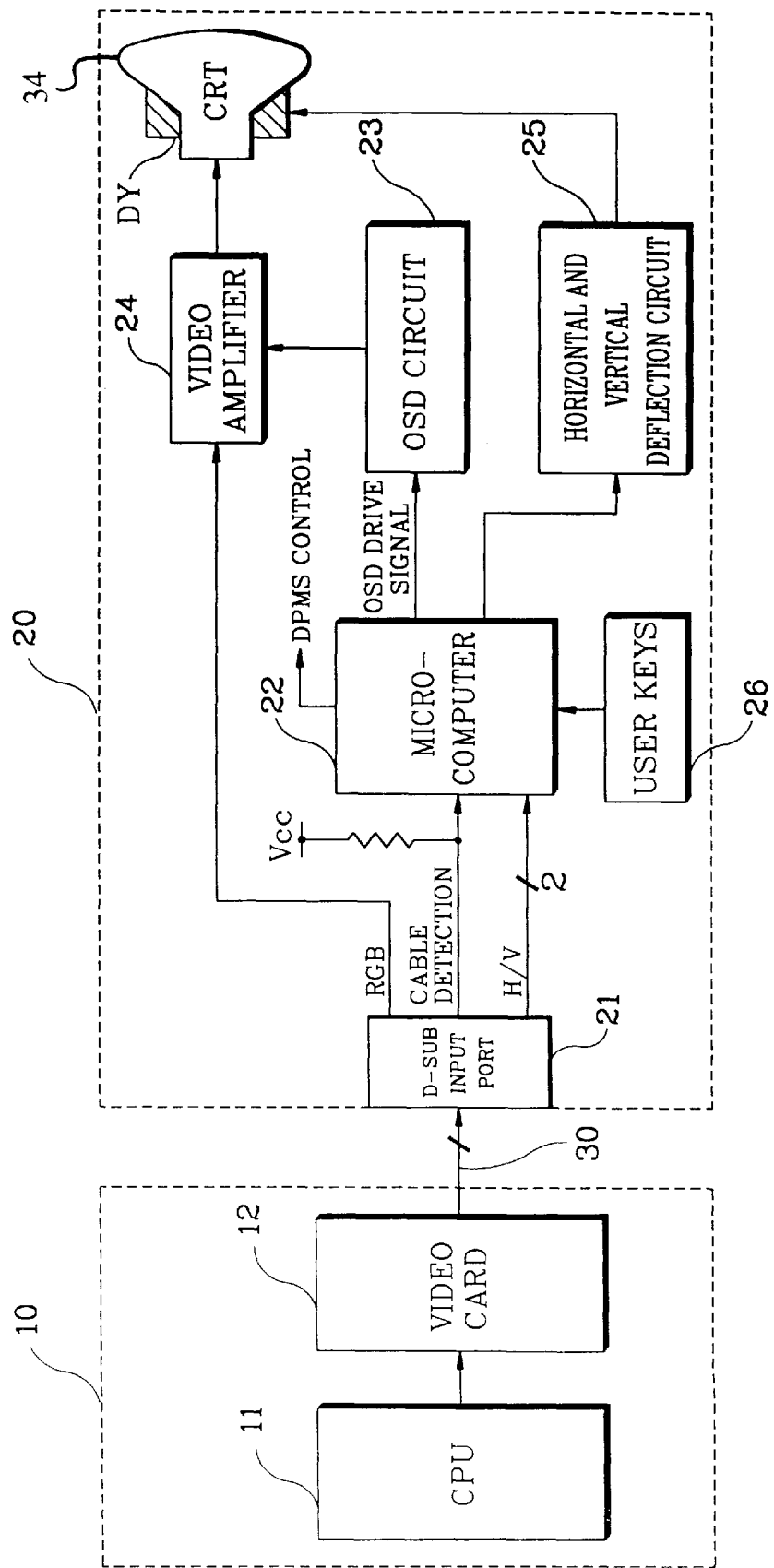
FIG. 1 is a block diagram of a personal computer system adopting the apparatus of the present invention.

Referring to FIG. 1, data processed by a CPU 11 of a main body 10 of a personal computer system is converted to an RGB video signal by a video card 12. The video card 12 also generates a horizontal sync signal (H) and a vertical sync signal (V) for synchronizing the displayed video signal. The RGB video signal and the sync signals output from the video card 12 are transmitted to a D-sub input port 21 of a display device 20 via a signal cable 30. The RGB video signal transmitted to the D-sub input port 21 is output to a video pre-amplifier 24 for amplification. The amplified video signal is then applied to a CRT 34 under the control of a horizontal and vertical deflection circuit 25 in accordance with sawtooth waveforms respectively output to a pair of deflection yokes (DY).

A microcomputer 22 comprises an internal memory (not shown), such as an EEPROM, which stores information regarding the status of the display device 20. More specifically, the microcomputer 22 stores a current DPMS state in response to the detection of horizontal and vertical sync signals received via the D-sub input port 21 as well the proper connection of the signal cable 30. This hardware connection is determined using, for example, a pull-up resistor to apply a logic "high" voltage signal whenever there is no ground signal provided from the video card 12 via the signal cable 30 having a cable detection line.

Based on the stored DPMS status information, the microcomputer 22 determines the proper DPMS mode and sets a DPMS control output via a DPMS output port, accordingly. When a power-savings mode is determined and no video signal is displayed, i.e., a condition other than the normal mode, the microcomputer 22 interprets an activation of any one of user keys 26, which are normally conventional display controls located on the front panel of the display device, as a program interrupt signal. Upon receipt of a program interrupt, the microcomputer 22 generates an OSD drive signal output to an OSD circuit 23 to thereby display the current DPMNS mode, as will be described with respect to FIGS. 2 and 3.

Figure 2:
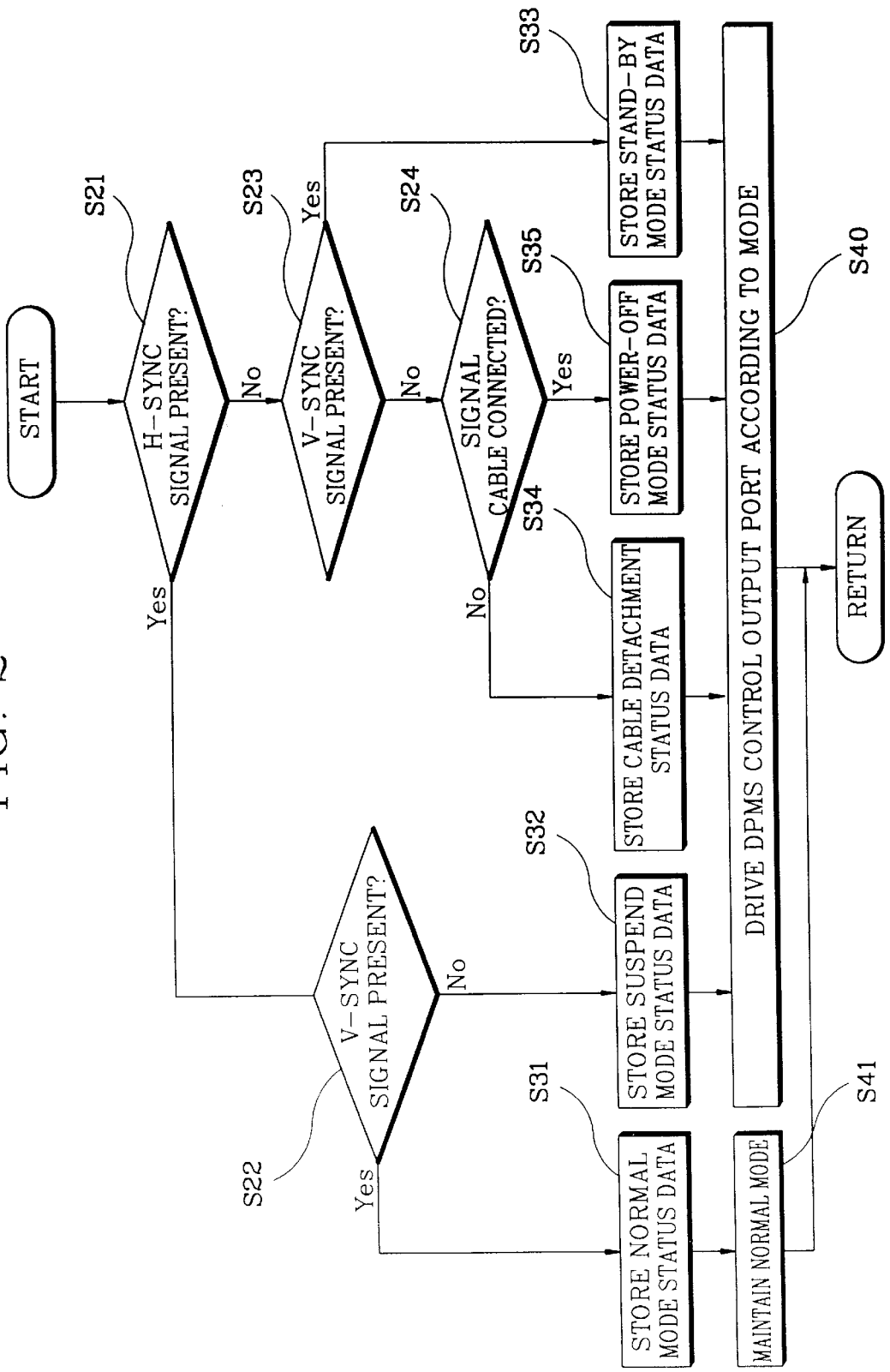
FIG. 2 is a flow chart showing the operation of a display device in which power distribution is controlled according to DPMS mode, adopting the method of the present invention.

As illustrated in FIG. 2, when the horizontal and vertical sync signals are input to the microcomputer 22 through the D-sub input port 21, the microcomputer determines the current input status, normal or otherwise, of the sync signals (steps S21, S22, S23 and S24). As a result of this determination, the current DPMS state is stored in the memory of the microcomputer 22 (steps S31, S32, S33, S34 and S35).

Specifically, the microcomputer 22 determines whether a horizontal sync signal generated by the video card 12 in the main body 10 is input in step S21 If the horizontal sync signal is determined to be input (present), the microcomputer 22 then determines whether a vertical sync signal is input in step S22. If both the horizontal and vertical sync signals are input, data corresponding to the current DPMS state and indicative of a normal DPMS mode of operation is stored in the memory of the microcomputer 22 in step S31, and normal operation of the display device is maintained in step S41. If it is determined in step S22 that the vertical sync signal is not input, data corresponding to the current DPMS state and indicative of a suspend DPMS mode is stored in the memory of the microcomputer 22 in step S32. If it is determined in step S21 that the horizontal sync signal is not input, the microcomputer 22 checks for the presence of a vertical sync signal in step S23. If it is determined in step S23 that the vertical sync signal is input, data corresponding to the current DPMS state and indicative of a standby DPMS mode is stored in the memory of the microcomputer 22 in step S33.

In step S24, which is an application of the DPMS mode unique to the present invention, the proper connection of the signal cable 30 is checked. If it is determined that the signal cable 30 is connected, data corresponding to the current DPMS state and indicative of a power-off DPMS mode is stored in the memory of the microcomputer 22 in step S35; but if it is determined that the signal cable 30 is not connected, data corresponding to the current DPMS state and indicating a "cable-detached" state is stored in the memory of the microcomputer 22 in step S34. Conventionally, however, a determination of the absence of the signal cable 30 automatically results in the exit of any DPMS operation so that OSD operation can be initiated to notify (warn) the user of such a condition.

After storing the current status data through the above operations, the microcomputer 22 drives the DPMS control output port according to the established mode in step S40. Meanwhile, as shown in FIG. 3, the microcomputer 22 recognizes a DPMS mode activation of the user keys 26 as an interrupt signal.

Figure 3:
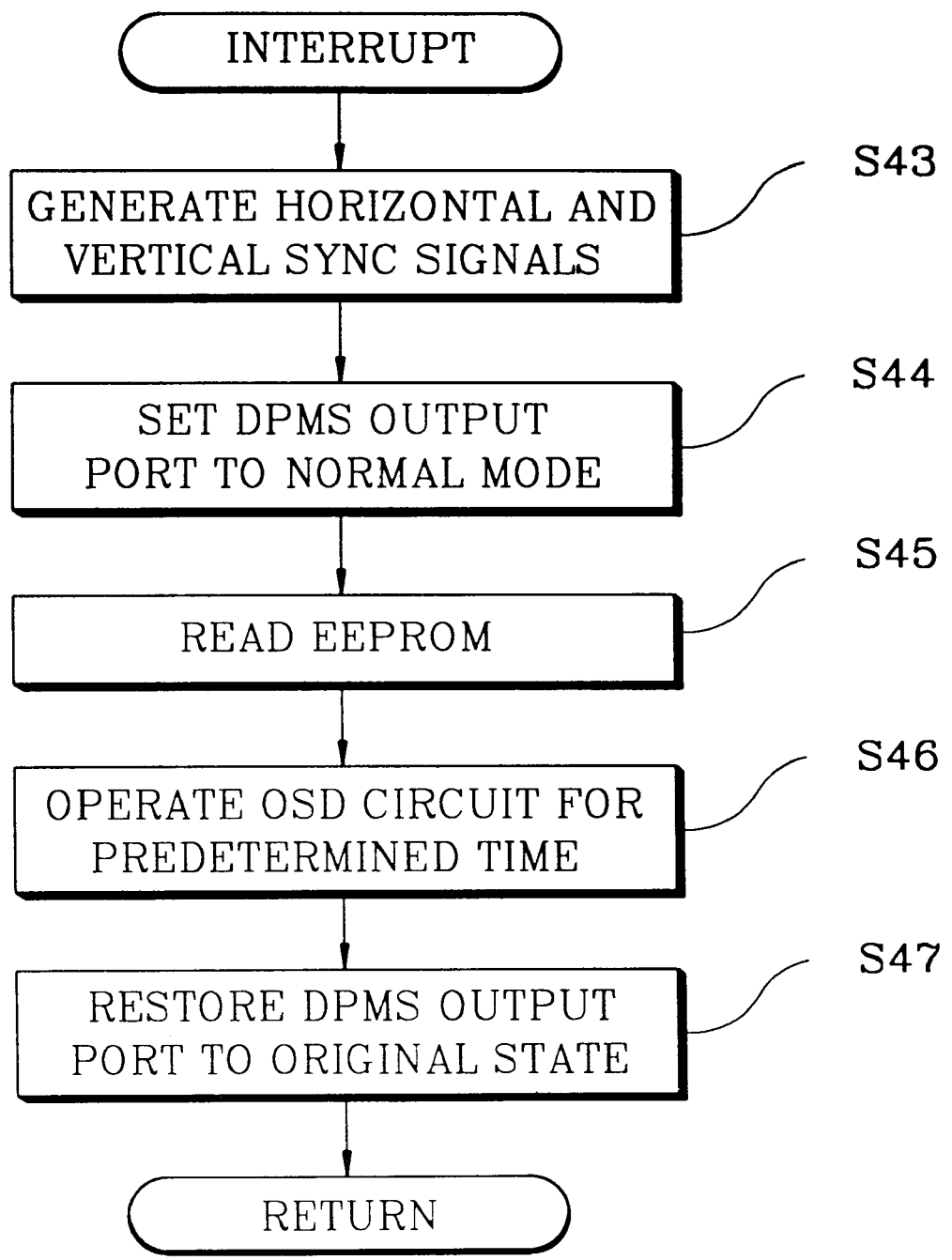
FIG. 3 is a flow chart of a method for displaying the current status of a DPMS mode in a display device using an OSD circuit, according to the present invention.

Referring to FIG. 3, once a user key input (interrupt) is detected, the microcomputer 22 generates, using internal oscillators (not shown), horizontal and vertical synchronous signals in step S43. The DPMS control output port of the microcomputer 22 is set to the normal mode in step S44, to enable the normal operation of the display device 20. Once thus set, the microcomputer 22 reads the stored status data corresponding to the current DPMS mode in step S45, and then transmits a corresponding OSD drive signal to the OSD circuit 23 through an OSD drive output port in step S46. Thus driven, the OSD circuit 23 outputs a corresponding OSD video signal to the video pre-amplifier 24 so that the current DPMS mode is displayed on the screen of the CRT 34 for a predetermined time sufficient for user recognition. During this time, the horizontal and vertical deflection circuit 25 receives the horizontal and vertical synchronous signals generated in the microcomputer 22 and thus synchronizes the OSD video signal by outputting a sawtooth wave to the deflection yoke in response to these "artificial" sync signals. After the predetermined time has elapsed, the OSD drive signal is removed from the OSD drive output port and, in step S47, the DPMS output port is reset to its original state, i.e., the state it was in before program interruption, which is the same as the displayed DPMS mode.

Figure 4:
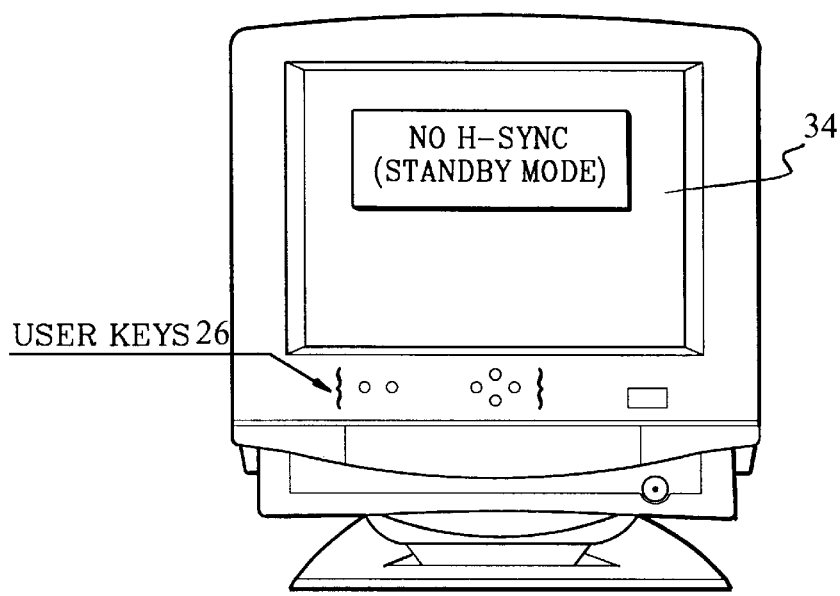
FIGS. 4–7 respectively show a display device displaying sample messages corresponding to various DPMS modes, according to the principles of the present invention.
Figure 5:
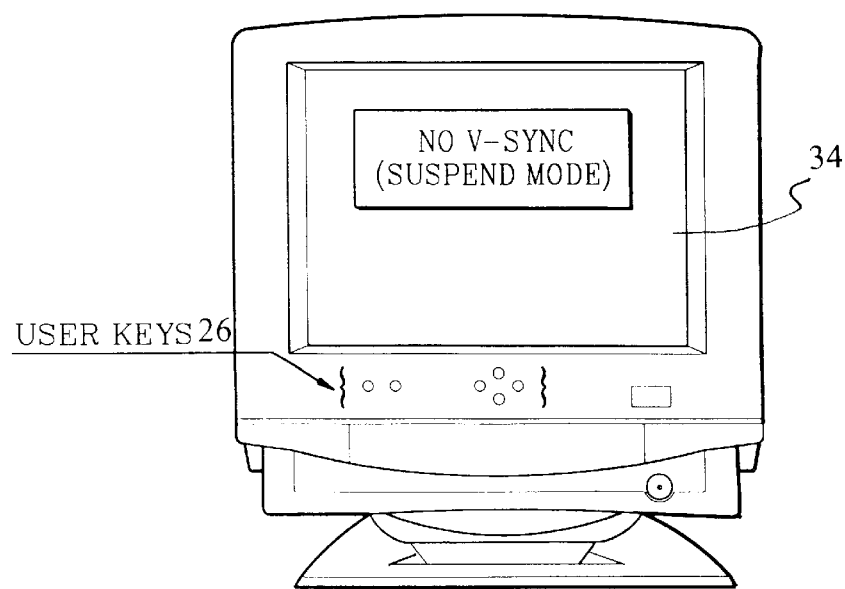
Figure 6:
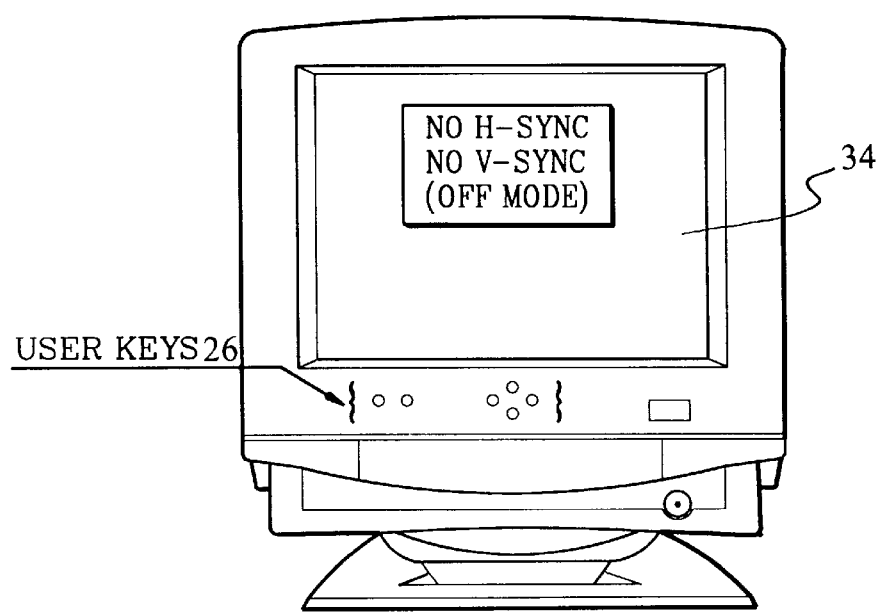
Figure 7:
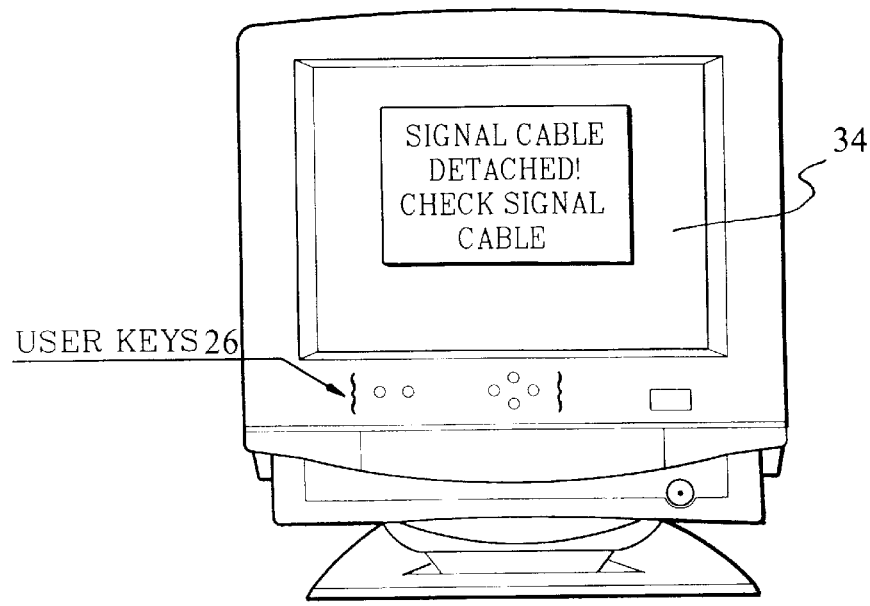

Through the above operations, the current DPMS mode status can be momentarily displayed on the display device 20, as shown by the examples of FIGS. 4–7. That is, as shown in FIG. 4, the standby DPMS mode is displayed when a vertical sync signal is received from the video card 12 but no horizontal sync signal is present. As shown in FIG. 5, the suspend DPMS mode is displayed when a horizontal signal is received from the video card 12 but no vertical sync signal is present. As shown in FIG. 6, when neither a horizontal sync signal nor a vertical sync signal is present with the signal cable attached, the power-off DPMS mode is displayed. As shown in FIG. 7, when the signal cable 30 is detached, a warning message indicating the detachment is displayed.

After the DPMS mode status is displayed as above, the microcomputer 22 removes the OSD drive signal and returns to the DPMS mode currently stored in memory. For example, when a current mode is a standby mode, after the standby mode message is displayed through the OSD circuit 23 during the predetermined time in order to inform a user of the current mode, the OSD drive signal is removed and the display device 20 is immediately converted from the normal mode, set in step S44, back to the standby mode. The process then returns to the main program (FIG. 2).

Accordingly, in a display device adopting a DPMS function, the apparatus and method of the present invention momentarily display the status of the current DPMS mode using an OSD function, upon user-manipulation of any key mounted on the display device. Thus, while minimizing power consumption by operating a display device in a DPMS mode, that is, when a personal computer system has identified a condition for DPMS operation, or when a D-sub signal cable is detached, the present invention enables a user to easily recognize the current DPMS state.

It will be apparent to those skilled in the art that various modifications can be made in the apparatus and method for displaying DPMS mode status using an OSD circuit of the present invention, without departing from the spirit of the invention. Thus, it is intended that the present invention cover such modifications as well as variations thereof, within the scope of the appended claims and their equivalents.

What is claimed is:

1. A method of displaying the status of a current display power management signaling (DPMS) mode using an on-screen display (OSD) circuit in a display device comprised of a microcomputer having an internal memory, the method comprising the steps of:

determining the current DPMS mode based on an input status of video sync signals by:

determining whether a horizontal sync signal input is present;

determining whether a vertical sync signal input is present when the horizontal sync signal input is present; and determining whether the vertical sync signal input is present when the horizontal sync signal input is not present;

storing, in the internal memory of the microcomputer, status data corresponding to the determined current DPMS mode; and driving the OSD circuit for a predetermined time using an OSD drive signal output from the microcomputer, to display on the display device a message indicative of the stored status data.

2. The method according to claim 1, further comprising the step of determining whether a cable for carrying the sync signals is connected when neither input is present.

3. The method according to claim 1, wherein said data storing step comprises the sub-steps of:

storing normal DPMS mode data when the presence of a the horizontal sync signal input and the vertical sync signal input are both determined;

storing suspend DPMS mode data when the presence of any the horizontal sync signal input is determined;

storing standby DPMS mode data when the presence of only the vertical sync signal input is determined; and storing power-off DPMS mode data when neither sync signal is input.

4. The method according to claim 3, further comprising the step of storing warning-message data when the signal cable for carrying the video sync signals is not connected.

5. The method according to claim 1, wherein the OSD driving step comprises the sub-steps of:

inputting a user key on the display device and thereby beginning the predetermined time for driving the OSD circuit;

generating a horizontal synchronous signal and a vertical synchronous signal;

reading the stored DPMS mode status data; and generating an OSD drive signal based on the data obtained in said reading step.

6. The method according to claim 5, further comprising the step of:

setting a DPMS output port to the normal mode for the duration of the predetermined time and resetting the DPMS output port after the predetermined time has elapsed.

7. An apparatus for displaying the status of a current display power management signaling (DPMS) mode on a display device controlled by a personal computer system including a video card, the apparatus comprising:

an input port for receiving a horizontal sync signal and a vertical sync signal via a signal cable connecting the video card to said input port;

a microcomputer, being connected to said input port and comprising an internal memory, for generating horizontal and vertical synchronous signals in response to the horizontal and vertical sync signals received by said input port;

at least one user key, mounted on the display device, for inputting a key signal to said microcomputer; and an on-screen display (OSD) circuit for generating an OSD video signal comprising a message indicative of the current DPMS mode, upon DPMS mode activation of said at least one user key, wherein said microcomputer determines respectively whether the horizontal sync signal is received by said input port, whether the vertical sync signal is received by said input port when it is determined that the horizontal sync signal is received by said input port, and whether the vertical sync signal is received by said input port when it is determined that the horizontal sync signal is not received by said input port such that said microprocessor stores status data corresponding to the current DPMS mode based on the resulting determination, and wherein said microcomputer detects the DPMS mode activation of said at least one user key and, during a predetermined time thereafter, outputs an OSD drive signal for driving said OSD circuit which thereby generates the OSD video signal to display on the display device the message indicative of the current DPMS mode.

8. The apparatus according to claim 7, wherein said microcomputer outputs internally generated horizontal and vertical synchronous signals in response to the DPMS mode activation of said at least one user key, when said input port does not receive either sync signal from the video card.

9. The apparatus according to claim 7, wherein said microcomputer outputs internally generated horizontal and vertical synchronous signals in response to the DPMS mode activation of said at least one user key, when the signal cable is not connected to said input port.

10. The apparatus according to claim 7, wherein said microcomputer determines whether the signal cable is connected to said input port when it is determined that neither sync signal is received by the input port.

11. The apparatus according to claim 7, wherein said microcomputer stores DPMS status data indicative of a normal DPMS mode when both sync signals are received by said input port, stores DPMS status data indicative of a suspend DPMS mode when only the horizontal sync signal is received by said input port, stores DPMS status data indicative a standby DPMS mode when only the vertical sync signal is received by said input port, and stores DPMS status data indicative of a power-off DPMS mode when neither sync signal is received by said input port.

12. The apparatus according to claim 11, wherein said microcomputer stores DPMS status data indicative a detachment state of the signal cable when the signal cable is not connected to said input port.

13. The apparatus according to claim 7, wherein said microcomputer further comprises a DPMS output port for controlling power distribution in the display device, the DPMS output port being set to a DPMS state corresponding to a normal DPMS mode for the duration of the predetermined time when said at least one user key is activated in a DPMS mode, thereby enabling the message indicative of the current DPMS mode to be displayed on the display device during the predetermined time.

14. A method of displaying the status of a current display power management signaling (DPMS) mode using an on-screen display (OSD) circuit in a display device comprised of a microcomputer having an internal memory, the method comprising the steps of:

determining the current DPMS mode based on an input status of video sync signals;

storing, in the internal memory of the microcomputer, status data corresponding to the determined current DPMS mode, wherein said storing step comprises the sub-steps of:

storing as said status data normal DPMS mode data when the presence of a horizontal sync signal input and a vertical sync signal input are both determined;

storing as said status data suspend DPMS mode data when the presence of only the horizontal sync signal input is determined;

storing as said status data standby DPMS mode data when the presence of only the vertical sync signal input is determined; and storing as said status data power-off DPMS mode data when neither sync signal is input; and driving the OSD circuit for a predetermined time using an OSD drive signal output from the microcomputer, to display on the display device a message indicative of the stored status data.

15. The method according to claim 14, wherein said step of determining the current DPMS mode comprises the sub-steps of:

determining whether the horizontal sync signal input is present;

determining whether the vertical sync signal input is present when the horizontal sync signal input is present; and determining whether the vertical sync signal input is present when the horizontal sync signal input is not present.

16. The method according to claim 15, further comprising a step of determining whether a cable for carrying the sync signals is connected when both the horizontal sync signal input and the vertical sync signal input are absent.

17. The method according to claim 16, further comprising a step of storing warning-message data when it is determined that the cable for carrying the sync signals is not connected.

18. The method according to claim 17, wherein the OSD driving step comprises the sub-steps of:

inputting a user key on the display device and thereby beginning the predetermined time for driving the OSD circuit;

generating a horizontal synchronous signal and a vertical synchronous signal;

reading the stored DPMS mode status data; and generating an OSD drive signal based on the data obtained in said reading step.

19. The method according to claim 18, further comprising the step of:

setting a DPMS output port to the normal mode for the duration of the predetermined time and resetting the DPMS output port after the predetermined time has elapsed.

* * * * *